Figure 1:
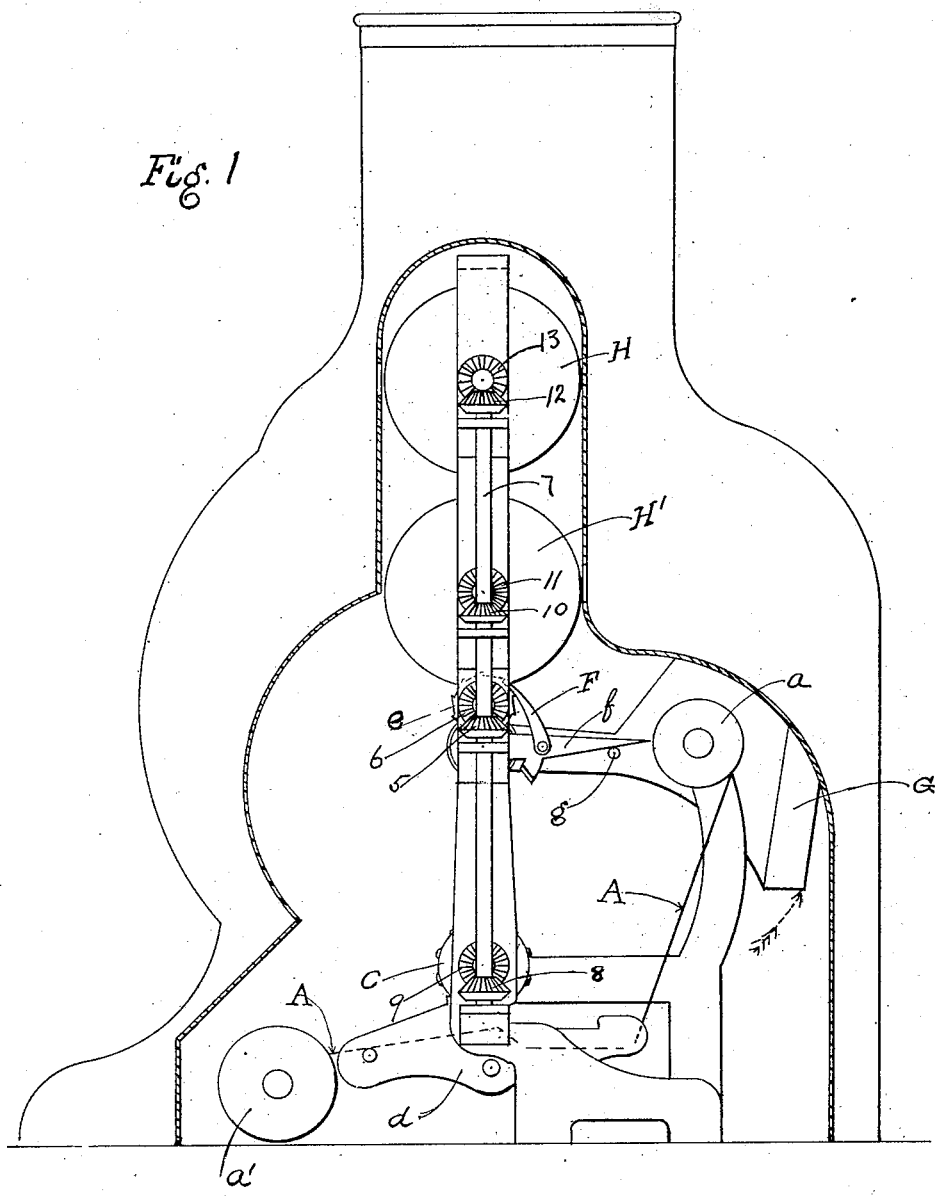

No. 720,431. PATENTED FEB. 10, 1903.
B. K. HOPPOCK.
CASH REGISTER.
APPLICATION FILED OCT. 11, 1902.
NO MODEL. 2 SHEETS—SHEET 1.

WITNESSES:
Walter Abby
S. C. Connor

INVENTOR
Benjamin K. Hoppock
BY
Howson and Howson
ATTORNEYS

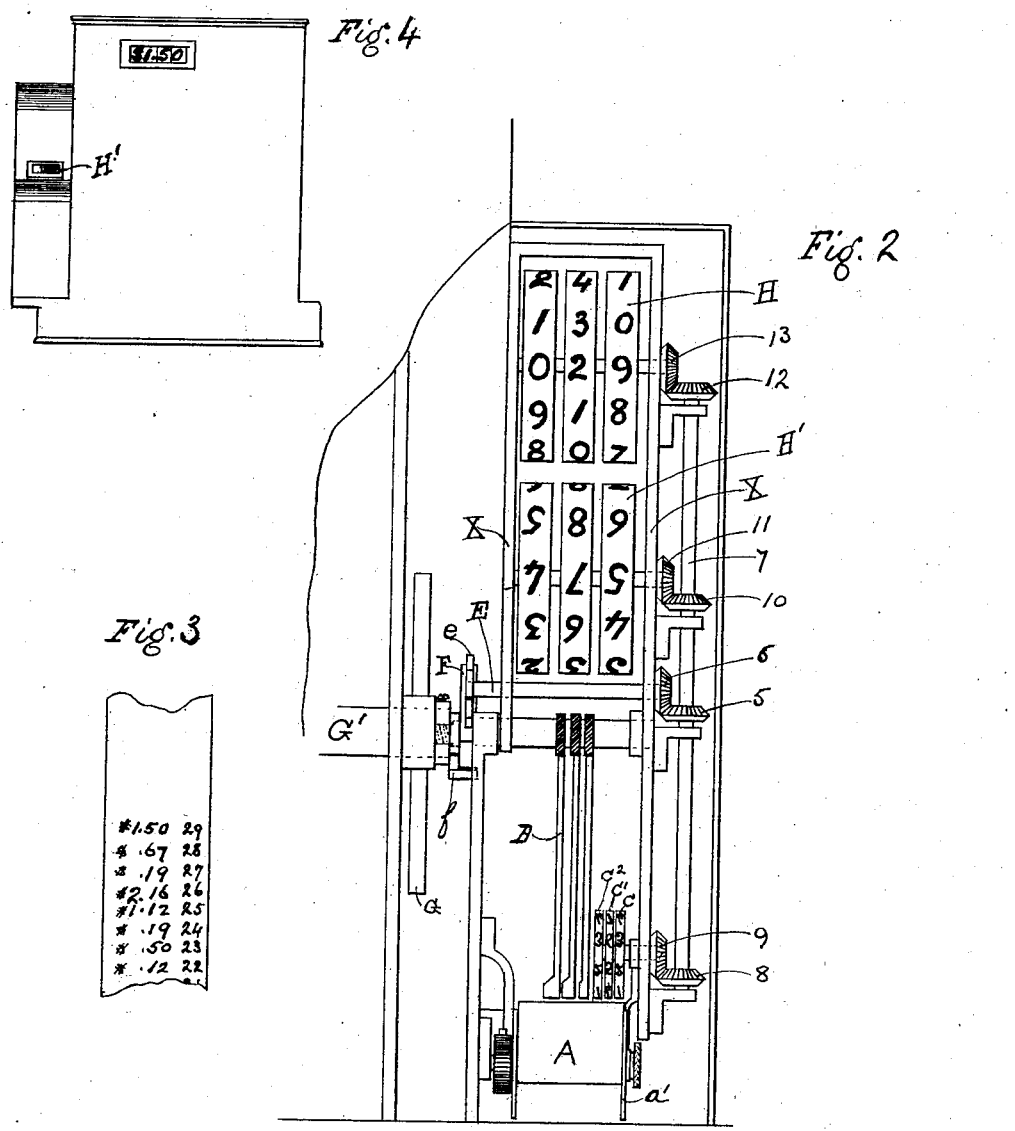

UNITED STATES PATENT OFFICE.

BENJAMIN K. HOPPOCK, OF SOMERVILLE, NEW JERSEY.

CASH-REGISTER.

SPECIFICATION forming part of Letters Patent No. 720,431, dated February 10, 1903.

Application filed October 11, 1902. Serial No. 126,934. (No model.)

*To all whom it may concern:*

Be it known that I, BENJAMIN K. HOPPOCK, a citizen of the United States of America, residing in Somerville, in the county of Somerset, State of New Jersey, have invented Improvements in Cash-Registers, of which the following is a specification.

The use of cash-registers in stores and elsewhere has become so universal that customers no longer pay much, if any, attention to the indications thereon of the amounts of their purchases, and particularly so when they do not have to wait for change. Thus a sales person observing that a customer has gone out of the store after paying for his purchase without noticing the indication of the sale on the cash-register can record and put into the cash-drawer an amount smaller than that actually paid by the customer.
The main object of my present invention is to provide cash-registers with means whereby a fraud of this character can be readily detected by a "spotter." For this purpose I employ a cash-register which may be of any ordinary and suitable construction, provided it has a record-strip on which the detailed sales are recorded. I provide a register of this character with mechanism for consecutively numbering the several successive sales on the record-strip and also with mechanism for indicating the numbers of the successive sales. By this means a spotter coming into the store will notice the number of the transaction or sale indicated on the machine and having made a purchase can then pay to the sales person the amount of the purchase and walk out without paying any attention to any indication and record which the sales person may then choose to make on the cash-register of the supposed amount of the sale. The spotter, however, can report to the proprietor or manager of the store that in a sale of such and such a number made to him he had paid so much, so that the salesman's honesty can be ascertained by simply examining the sale of that number on the detailed record-strip in in the machine.

My invention may be embodied in many different forms; but in the accompanying drawings I have illustrated one form in which it may be conveniently carried into effect.

In the drawings, Figure 1 is a sectional elevation of the printing end of a cash-register embodying my invention. Fig. 2 is a sectional front elevation of the same end of the machine. Fig. 3 is a view of a part of a detailed record-strip, and Fig. 4 is a rear view of a cash-register drawn to a smaller scale to illustrate some of the indicator arrangements.

Referring to Figs. 1 and 2, A is the detailed record-strip on which the amounts of the successive sales are printed or otherwise impressed in any ordinary way by the printing segment or wheels B. This record-strip is unwound from the spool $a$ and passing through the frame $d$ is intermittently fed forward and wound onto the roll $a'$ by any suitable means. Adjacent to these printing-wheels B, I provide number-printing wheels C C' C², preferably three of them, for the units, tens, and hundreds. These numbering-wheels are actuated to bring the successive numbers into the printing position immediately over the record-strip A by successive motions of the drawer of the cash-register and preferably by the inward motion of the drawer and near the end of such inward motion. Various devices may be employed whereby that motion of the drawer is conveyed to the numbering-wheels. For the sake of illustration I have shown a shaft E, mounted in the frame X of the machine, as provided at one end with a ratchet-wheel $e$, having ten teeth and to be actuated by a spring-pawl F on the arm $f$, which is freely pivoted on the shaft E. This pawl-arm is to be struck by a pin or projection $g$ on the segment G swinging on the main shaft G', which is moved in the direction of the arrow by the inward movement of the drawer. The intermittent rotation imparted to the shaft E may be transmitted to the numbering-wheels C through the medium of bevel-gears 5 6, vertical shaft 7, and bevel-gears 8 9, as will be readily understood.

I also provide the machine, as I have said, with means for indicating to the purchaser (as well as printing on the record-strips) the number of each successive transaction. In the construction illustrated in the drawings such number-indicating wheels are shown at H and H', for I have shown two sets of these numbering-wheels, duplicates of each other except that one set is intended to show the numbers through an opening in the case in the front of the machine, whereas the other set will show through an opening in the case at the back of the machine, as at H', Fig. 4. I transmit the necessary intermittent motion to the number-indicating means by any suitable device. For illustration, in the drawings I have shown these wheels as receiving such motion from the shaft E through the medium of gears 10 11 and 12 13.

With the construction described it will be seen that when the drawer is pushed back in the direction of the arrow, Fig. 1, to the closed position the weighted segment G, toward the end of its stroke, immediately after the printing on the record-strip has taken place, will through the pawl F impart a partial rotary movement to the shaft E, and thus to the number-printing wheels C C' and to the number-indicating wheels H H'. These latter thus show the number of the next transaction, so that the purchaser coming into the store will see the number of the next transaction will be "29," for instance. When the drawer is pulled open again and then closed once more, the number "29" will be printed, with the amount of the sale—say $1.50—on the record-strip A, as indicated, for example, in Fig. 3. Then immediately the numbering-wheels C C' $C^2$ and the corresponding indicating-wheels H H' will be turned to "30" for the next transaction at the close of the inward movement of the drawer and after the printing of "29" corresponding to the amount of the sale.

I claim as my invention—

A cash-register having mechanism for impressing the amounts of the successive sales on a detailed record-strip in combination with means for numbering the successive transactions on the said record-strip and means for correspondingly indicating the numbers of the successive sales, substantially as described.

In testimony whereof I have signed my name to this specification in the presence of two subscribing witnesses.

BENJAMIN K. HOPPOCK.

Witnesses:
HUBERT HOWSON,
F. WARREN WRIGHT.